United States Patent [19]

Loegering

[11] 4,364,833

[45] Dec. 21, 1982

[54] APPARATUS FOR REMOVING SUBSTANCES FROM A MIXTURE

[75] Inventor: Cory L. Loegering, Lake Charles, La.

[73] Assignee: Conoco Inc., Ponca City, Okla.

[21] Appl. No.: 242,802

[22] Filed: Mar. 11, 1981

[51] Int. Cl.³ .............................................. B01D 21/08
[52] U.S. Cl. .................................................... 210/521
[58] Field of Search ................... 210/521, 522, DIG. 5

[56] References Cited

U.S. PATENT DOCUMENTS

| | | | |
|---|---|---|---|
| 1,672,583 | 6/1928 | Travers | 210/513 |
| 1,902,171 | 3/1930 | Kopp | 210/513 |
| 2,090,313 | 8/1937 | Schumacher | 210/522 |
| 2,125,722 | 8/1938 | Hawkins | 210/51 |
| 2,228,989 | 7/1942 | Boosey | 182/9 |
| 2,467,003 | 4/1949 | Bach | 210/55 |
| 2,602,465 | 7/1952 | Goehring | 137/582 |
| 2,826,306 | 3/1958 | Burns | 210/114 |
| 3,147,221 | 9/1964 | Johnston | 210/519 |
| 3,517,815 | 6/1970 | Bolton | 210/256 |
| 3,527,348 | 9/1970 | LaLonde et al. | 210/84 |
| 3,529,720 | 9/1970 | Chablaix | 210/123 |
| 3,731,802 | 5/1973 | James | 210/84 |
| 3,853,753 | 12/1974 | Jones | 252/330 |
| 3,907,682 | 9/1975 | Basseet | 210/114 |
| 3,933,654 | 1/1976 | Middlebeek | 210/521 |
| 3,957,656 | 5/1976 | Castelli | 210/521 |
| 3,971,719 | 7/1976 | Peters | 210/104 |
| 4,064,054 | 12/1977 | Anderson | 210/536 |
| 4,247,312 | 1/1981 | Thakur et al. | 210/522 |

FOREIGN PATENT DOCUMENTS

| | | |
|---|---|---|
| 19161 | of 1891 | United Kingdom . |
| 756230 | 9/1956 | United Kingdom . |
| 983555 | 2/1965 | United Kingdom . |

*Primary Examiner*—Ivars C. Cintins
*Attorney, Agent, or Firm*—Stephen A. Littlefield

[57] ABSTRACT

A first parallel plate coalescing assembly comprising vertically oriented plates and a second parallel plate coalescing assembly comprising horizontally disposed plates are disposed in spaced alignment along a flow path defined within a separator vessel. The vertically oriented plates are positioned upstream of the horizontally positioned plates so that the mixture flows through them first.

10 Claims, 3 Drawing Figures

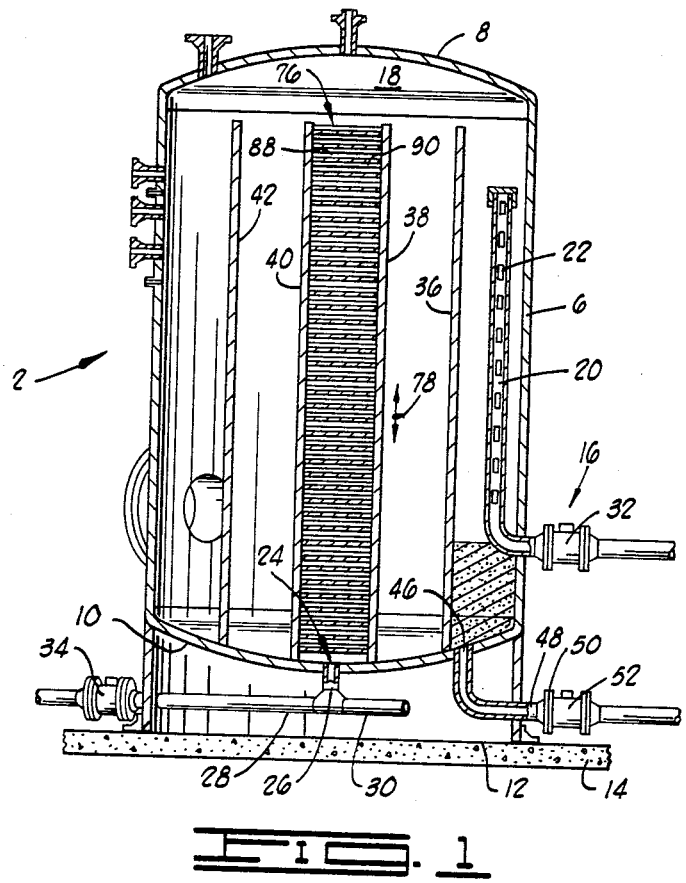
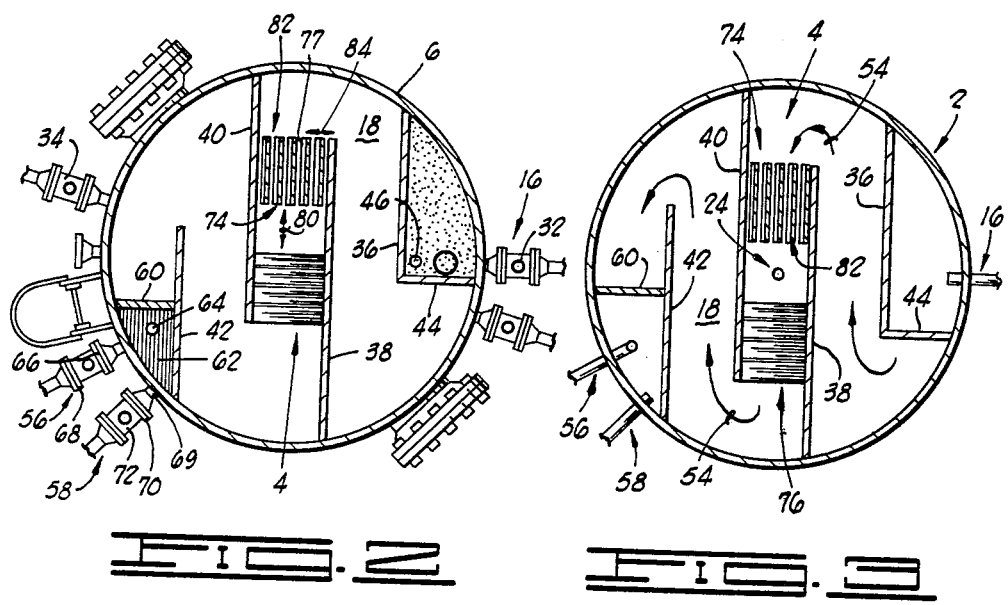

APPARATUS FOR REMOVING SUBSTANCES FROM A MIXTURE

BACKGROUND OF THE INVENTION

1. Field of the Invention

This invention relates generally to a coalescing assembly for use in a separator and more particularly, but not by way of limitation, to a parallel plate coalescing unit for use in an internally baffled, horizontal-flow oil skimmer.

2. Description of the Prior Art

During the operation of an oil well a mixture of water contaminated with oil and particulate solids is often recovered. For environmental and conservational purposes it is desirable to separate the contaminants from the water prior to discharging the water into the environment.

To remove the oil and particulate solids from the water, separator apparatus known as skimmers or settling tanks have been developed. These separators are often placed upstream of a water polishing apparatus which further cleanses the water. The separators include such types as horizontal vessels having the mixture flow horizontally therethrough, vertical vessels having vertical flow therethrough and vertical vessels having horizontal flow therethrough. Separation of the oil and particulate solids from the water in these types of devices occurs because of the tendencies of the oil to rise and the solids to drop in the water as the mixture flows through the particular separator vessel.

To improve the separation or skimming of the contaminants from the mixture, coalescing means can be placed in the vessels. The coalescing means causes particles of oil to cohere so that larger droplets of oil having faster rise velocities are formed to insure that the oil will rise to the top of the water for being skimmed therefrom within the time it takes the water to flow through and exit the separator vessel.

A coalescing means is disclosed in U.S. Pat. No. 3,957,656 in the name of Castelli. This patent discloses a plate separator comprising horizontally oriented plates being positioned parallel to each other and having corrugations which extend normal to the flow path through the separator vessel. The corrugations on each plate are shaped and positioned relative to those on adjacent plates to provide alternately constricting and expanding fluid passages so that accelerations and decelerations are imparted to the mixture flowing along the plates. Prior to passing through the plate separator, the mixture passes through a flow equalizing baffle including a number of parallel, vertical spaced slats. The Castelli separator apparatus can also include an additional section of separator plates which are separated from the first section of separator plates by coalescing filters. The Castelli patent further discloses that the plates might be made of polypropylene.

The use of a single coalescing means is also disclosed in U.S. patent application Ser. No. 117,680 entitled INTERNALLY BAFFLED, HORIZONTAL FLOW, VERTICAL OIL SKIMMER and filed Feb. 1, 1980 in the name of Warne, Jr. This application discloses a vertical separator vessel in which a fluid mixture is caused to flow along a sinuous horizontal path, and this application mentions that a single coalescing medium can be disposed along the path for coalescing the oil in the mixture.

It has been observed that in a vessel of the type disclosed in the aforementioned Warne, Jr. application, the separation efficiency of the vessel decreases as the flow rate of the mixture through the vessel decreases. An analysis of residence time distribution curves derived from performance data gathered during the testing of an apparatus of the type disclosed in the Warne, Jr. application suggests that short-circuiting may be occurring at the lower flow rates. Short-circuiting is a channeling effect wherein positive flow occurs through only a portion of the cross-section of the total possible flow path.

Therefore, there is the need for an apparatus which can coalesce substances from a mixture and which can overcome the channeling effect detected to exist at relatively low flow rates in at least some types of separator vessels. There is also the need for such an apparatus to aid in the removal of solids from the mixture so that coalescing is not impeded and so that the mixture can be more fully cleansed. Additionally, it is desirable for such an apparatus to more fully remove the desired substances from the mixture so that further polishing of the primary fluid (e.g., water) is unnecessary or is at least aided by the operation of the apparatus. It is also desirable for such an apparatus to be constructed so that it can be located along a single segment of a sinuous flow path of a separator vessel.

SUMMARY OF THE INVENTION

The present invention overcomes the above-noted and other shortcomings of the prior art by providing a novel and improved apparatus for removing substances from a mixture. This apparatus increases the efficiency in an appropriate separator vessel by reducing or preventing the short-circuiting effect. The present invention also coalesces oil and aids in the removal of particulate solids from the mixture. The invention additionally provides a degree of polishing to the water contained in the mixture. The apparatus can be located along a single segment of a sinuous flow path of a separator vessel.

Broadly, the present invention includes a first plurality of plates spaced horizontally from each other and a second plurality of plates spaced vertically from each other and collectively spaced from the first plurality of plates. The first plurality of plates defines a plurality of vertical flow channels, each of which has a length along the flow path of the mixture which is substantially longer than the width of the respective channel across the respective portion of the total cross-section of the flow path. The second plurality of plates defines a plurality of horizontal flow channels, each of which has a length parallel to the flow path which is substantially longer than the width of the respective flow channel across the respective portion of the total cross-section of the flow path.

It is contemplated that the first and second pluralities of plates be specifically utilized with a vessel including a chamber, inlet means for inputting the flow of the mixture to the chamber, first outlet means for discharging from the chamber at least a portion of a solid in the mixture, second outlet means for releasing from the chamber at least a portion of a liquid in the mixture, third outlet means for outputting from the chamber the primary fluid in the mixture, and flow direction means disposed within the chamber for directing the flow of the mixture along a horizontal path through the chamber.

It is further contemplated that the first plurality of plates defining the vertical flow channels be disposed in the vessel upstream of the second plurality of plates defining the horizontal flow channels.

From the foregoing, it is a general object of the present invention to provide a novel and improved apparatus for removing substances from a mixture. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 1 is a sectional elevational view of a preferred embodiment of a vessel and coalescing means constructed in accordance with the present invention.

FIG. 2 is a sectional plan view of the preferred embodiment shown in FIG. 1.

FIG. 3 is a schematic sectional plan view of the preferred embodiment.

DETAILED DESCRIPTION OF A PREFERRED EMBODIMENT OF THE PRESENT INVENTION

With reference to the drawings a preferred embodiment of the present invention will be described. The initial description pertains to a vertical oil separator 2 in which a coalescing means 4 of the present invention can be utilized. The separator vessel 2 is of the type described in the aforementioned Warne, Jr. patent application.

The vertical oil separator 2 is used in the preferred embodiment for separating oil and particulate solids from a mixture of oil, water and particulate solids and comprises a vertically elongated separator vessel being fabricated of a cylindrically-joined vertical side wall 6 and having a semihemispheroid-shaped top 8 and a semihemispheroid-shaped bottom 10 joined in fluid-tight relationship with the side wall 6. The separator 2 is supported on a base 12 which in turn is supported by a supporting medium 14 such as a deck member, a concrete pad, or the like.

The separator 2 has inlet means 16 for inputting a flow of the mixture to a chamber 18 defined within the separator 2 by the side wall 6, the top 8 and the bottom 10. The inlet 16 is connected to a vertical fluid distributor 20 having slots 22 for providing a passage for the mixture into the chamber 18. The separator 2 also has a first outlet means 24 leading through tee 26 and outwardly through ports 28 and 30 to plumbing suitable for flushing or draining the separator 2.

Suitable valves 32 and 34 are provided for controlling the flows through the inlet 16 and the outlet 24, respectively.

The separator 2 further includes flow direction means disposed within the chamber 18 for directing the flow of the mixture along a horizontal path through the chamber 18. The flow direction means of the preferred embodiment includes interior baffles 36, 38, 40 and 42. Each of these baffles is joined to the separator 2 in fluid-tight engagement therewith along the portions thereof illustrated in FIGS. 1 and 2. The baffles define a sinuous path which includes a plurality of segments along each of which the fluid flows substantially in a constant or single direction.

FIG. 2 illustrates that the baffle 36 is connected to a baffle 44. These two baffles form a trap for the particulate solid, such as sand, which settles to the bottom of the trap during operation of the separator 2. An opening 46 located near the lowest point of the trap is connected through a port 48, a connector flange 50 and a suitable valve 52 to disposal plumbing for the particular solids.

From the inlet 16 and the trap region formed by the baffles 46 and 44, the remaining baffles define the circuitous or sinuous path for directing the mixture to flow along a horizontal path as illustrated in FIG. 3 by the arrows 54. The horizontal direction of flow is changed by a total of at least 360° between the inlet 16 and both a second outlet means 56 for releasing at least a portion of the oil from the chamber 18 and a third outlet means 58 for outputting the water, having reduced quantities of the oil and sand, from the chamber 18.

The second outlet means 56 includes the baffle 42, a baffle 60, a baffle 62 and the side wall 6 of the separator 2. The baffle 62 has an opening 64 for releasing oil which has risen to the surface of the water and has passed over a weir defined by the upper edge of the baffle 60. This output means 56 provides means for recovering this portion of the oil. The opening 64 extends to a connector flange 66 and a suitable valve 68 which is connected to suitable plumbing means for recovering the oil.

The third outlet means 58 includes a port 69 extending to a flange 70 connected to a suitable valve 72 which is controllable to vary the output of the water from which at least a portion of the oil and particulate solids has been separated.

The coalescing means 4 is shown in the drawings to be substantially centrally located within the chamber 18 of the separator 2. The coalescing means 4 comprises a first plurality of plates generally identified by the reference numeral 74 and a second plurality of plates generally identified by the reference numeral 76.

The first plurality of plates 74 includes in the preferred embodiment a first parallel plate coalescing assembly including vertical plate means. The first plurality of plates 74 specifically includes several vertically extending plates disposed parallel to each other. Each of the vertical plates has a front edge and a rear edge which are coplanarly aligned with the front and rear edges, respectively, of each of the other plates within the preferred embodiment of the first plurality of plates 74. Each of the vertical plates is spaced horizontally from each other vertical plate. In a specific embodiment the horizontal spacing is approximately ¼ inch and spacing is maintained by suitably bolting or otherwise securing the plates together. The plates are removable from the separator 2 so that they can be cleaned or replaced or otherwise maintained.

Each of the plates of the first plurality of plates 74 includes a surface 77 which extends substantially parallel to a vertical axis of the separator (this direction is identified in FIG. 1 by the reference numeral 78) and which also extends substantially parallel to the mixture flow path through the segment of the sinuous horizontal path in which the plurality of plates 74 is disposed (this direction is identified in FIG. 2 by the reference numeral 80). Facing pairs of the surface 77 of adjacent plates within the first plurality of plates 74 define respective vertical flow channels 82. The length of each flow channel is defined by the dimension 80 of the surface 77 extending substantially along the flow path to the mixture. The width of the flow channels is defined by the length of a line extending perpendicularly between the facing surfaces of adjacent plates (this direction is identified in FIG. 2 by the reference numeral 84).

In the preferred embodiment the length of each vertical flow channel is substantially longer than the width. The surfaces 77 can be flat, corrugated (as in the preferred embodiment), or any other suitable configuration. In the preferred embodiment the corrugations extend substantially parallel to the principal direction of flow of the mixture through the first plurality of plates 74 and provide more surface area along which coalescence can occur than is provided by a flat surface.

The second plurality of plates 76 comprises a second parallel plate coalescing assembly for the preferred embodiment shown in the drawings. The second parallel plate coalescing assembly includes horizontal plate means specifically comprising horizontally disposed plates which are spaced vertically from each other. In a specific embodiment adjacent horizontal plates are separated by ¼ inch. The plates are bolted or otherwise connected together and are mounted in the separator 2 so that they can be removed to be cleaned or replaced or otherwise maintained.

The horizontally extending plates of the second plurality of plates 76 have surfaces 88 which extend across the flow path of the mixture substantially perpendicular to the axis of the separator 2. The surfaces 88 also extend substantially parallel to the flow of the mixture. Facing surfaces of adjacent ones of the horizontal plates define horizontal flow channels 80 having lengths, defined by the length of the horizontal plate surface extending substantially parallel to the flow of the mixture (identified in FIG. 2 by the reference numeral 80), substantially longer than widths, defined by the vertical spacing between facing surfaces of adjacent plates (identified in FIG. 1 by the reference numeral 78). As with the vertical plates of the first plurality 74, the surfaces 88 of the horizontal plates can be planar or multi-planar, such as being corrugated. As shown in the drawings the preferred embodiment of the horizontal plates includes corrugations extending substantially perpendicular to the flow path of the mixture as it flows through the second plurality of plates 76.

The first plurality of plates 74 and the second plurality of plates 76 are disposed in the separator 2 across the cross-sectional area of the flow path of the mixture. In particular, the two pluralities of plates are disposed along a single one of the segments of the flow path defined by the baffles disposed within the chamber 18. So that the particulate solids can be deposited from the mixture into the bottom of the separator 2 for extraction through the outlet 24, it is preferred that the vertically extending first plurality of plates 74 be placed upstream of the horizontally extending second plurality of plates 76 whereby the first plurality of plates 74 receives the flow of the mixture before the second plurality of plates receives the flow. In this preferred positioning of the parallel plate coalescing assemblies shown in the drawings, it will be noted that the vertical flow channels and the horizontal flow channels are aligned. It is also to be noted in the preferred embodiment that the first plurality of plates 74 and the second plurality of plates 76 are collectively spaced from each other.

In operation the mixture of fluid containing, in the example of an oil well operation, oil and particulate solids (such as sand) mixed with water is received into the chamber 18 of the vessel 2 via the inlet 16. The mixture is dispersed through the distributor 20 at which location some of the particulate solid falls downward into the trap defined by the baffle 36 and the baffle 44 for being discharged therefrom.

The mixture flows around the baffle 36 and the baffle 38 into the first plurality of plates 74 comprising the vertically extending plates. The coalescing portion of the coalescing means 4 causes the oil particles to coalesce because of the nature of the plate structure which is preferably constructed of polypropylene, a preferentially oil-wet material. The coalescing gives a sufficient rise velocity to the oil so that it is able to rise toward the top of the mixture for expulsion from the chamber 18 through the second outlet means 56 before the mixture can flow completely through the separator 2. The oil tends to rise because it is less dense than the water.

The first plurality of plates 74 also causes at least a portion of the particulate solids to fall toward the bottom of the chamber 18 for removal therefrom through the first outlet means 24. The particulate solids tend to fall toward the bottom of the vessel because they are more dense than the water.

In addition to coalescing the oil and depositing the particulate solids, the first plurality of plates 74 overcomes or reduces short-circuiting along the horizontal flow path. By having the first plurality of plates 74 disposed across the entire cross-sectional area of the flow path segment defined between the baffles 38 and 40, the mixture is caused to flow through substantially, if not all, the entire cross-sectional area and not merely a small portion thereof.

Upon exiting the first plurality of plates 74 and flowign through the space between the first plurality of plates 74 and the second plurality of plates 76, the mixture enters the horizontally disposed plates of the second plurality of plates 76. The horizontal surface areas provided by the second plurality of plates 76 provide further coalescing area to further cleanse the mixture of the oil particles. This acts as a polishing means for further cleansing the water. Because a quantity of solids were removed from the mixture upon flowing through the first plurality of plates 74, there are less (if any) solids left in the mixture flowing through the second plurality of plates 76 to clog or block the horizontally disposed plates in the second assembly 76.

When the mixture flows through the second plurality of plates 76, it continues on its path toward the sump defined by the baffles 42, 60, and 62 and the side wall of the vessel 2. The oil which has been coalesced and which has risen to the top of the mixture passes over the weir provided by the baffle 60 for release from the chamber 18 through the outlet 56. The water from which the oil and particulate solids have been separated is output through the outlet 58.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

The embodiments of the invention in which an exclusive property or privilege is claimed are defined as follows:

1. An apparatus for separating a plurality of liquid, solid and gaseous components of a fluid mixture comprising:
   a separator vessel;
   inlet means for introducing said fluid mixture into said vessel;

outlet means for discharging said components of said fluid mixture from said vessel;

a fluid flow path in said vessel between said inlet and outlet means;

a first plurality of plate members in said flow path within said vessel, each of said first plate members defining a plane which is parallel to the plane of an adjacent one of said first plate members and spaced therefrom, said planes of said first plurality of plate members being parallel to said flow path, and a second plurality of plate members in said flow path within said vessel, each of said second plate members defining a plane which is parallel to the plane of an adjacent one of said second plurality of plate members and spaced therefrom, said planes of said second plurality of plate members being parallel to said flow path and at right angles to said planes of said first plurality of plate members.

2. The apparatus as set forth in claim 1 wherein said planes of said first and second plurality of plate members are disposed vertically and horizontally, respectively, within said separator vessel along said flow path.

3. The apparatus as set forth in claim 2, wherein:
said first plurality of plate members define a plurality of vertical flow channels having lengths along said flow path which are substantially longer than widths between said spaced adjacent first plate members; and
said second plurality of plate members define a plurality of horizontal flow channels having lengths along said flow path which are substantially longer than widths between said spaced adjacent second plate members.

4. The apparatus as set forth in claim 3, wherein said first plurality of plate members are spaced from said second plurality of plate members so that said first plurality of plate members receives a flow of the mixture before said second plurality of plate members receives the flow.

5. The apparatus as set forth in claim 4, wherein each of said first plurality of plate members includes corrugations extending substantially parallel to said flow path and each of said second plurality of plate members includes corrugations extending substantially perpendicular to said flow path.

6. The apparatus as set forth in claim 1, wherein said first plurality of plate members are spaced from said second plurality of plate members so that said first plurality of plate members receives a flow of the mixture before said second plurality of plate members receives the flow.

7. The apparatus as set forth in claim 6, wherein each of said first plurality of plate members includes corrugations extending substantially parallel to said flow path and each of said second plurality of plate members includes corrugations extending substantially perpendicular to said flow path.

8. The apparatus as set forth in claim 1, wherein each of said first plurality of plate members includes corrugations extending substantially parallel to said flow path and each of said second plurality of plate members includes corrugations extending substantially perpendicular to said flow path.

9. The apparatus as set forth in claim 1, wherein said first plurality of plate members are positioned in said vessel relatively upstream of said second plurality of plate members so that the fluid passes through said first plurality of plate members before the fluid passes through said second plurality of plate members.

10. The apparatus as set forth in claim 9, wherein:
said flow path through said vessel is along a sinuous flow path having a plurality of segments along each of which the fluid flows substantially in a single direction; and
said first and second plurality of plate members are disposed along a single one of said segments of said sinuous flow path.

* * * * *